(12) United States Patent
Lee

(10) Patent No.: US 9,598,855 B2
(45) Date of Patent: Mar. 21, 2017

(54) HEXAHEDRON UNIT FOR PREFABRICATED BUILDINGS AND METHOD OF ASSEMBLING THE HEXAHEDRON UNITS

(71) Applicant: Jung-Yeop Lee, Seoul (KR)

(72) Inventor: Jung-Yeop Lee, Seoul (KR)

( * ) Notice: Subject to any disclaimer, the term of this patent is extended or adjusted under 35 U.S.C. 154(b) by 0 days.

(21) Appl. No.: 14/378,426

(22) PCT Filed: Feb. 18, 2013

(86) PCT No.: PCT/KR2013/001255
§ 371 (c)(1),
(2) Date: Aug. 13, 2014

(87) PCT Pub. No.: WO2013/125821
PCT Pub. Date: Aug. 29, 2013

(65) Prior Publication Data
US 2016/0017595 A1 Jan. 21, 2016

(30) Foreign Application Priority Data

Feb. 23, 2012 (KR) .......................... 10-2012-0018454
Mar. 8, 2012 (KR) .......................... 10-2012-0023804

(51) Int. Cl.
*E04H 12/00* (2006.01)
*E04B 1/61* (2006.01)
(Continued)

(52) U.S. Cl.
CPC .............. *E04B 1/54* (2013.01); *E04B 1/3483* (2013.01); *E04B 1/5818* (2013.01); *E04C 3/00* (2013.01); *E04C 3/36* (2013.01); *E04B 1/5831* (2013.01); *E04B 2001/5881* (2013.01); *E04C 2003/0439* (2013.01); *E04C 2003/0465* (2013.01); *F16B 7/0433* (2013.01)

(58) Field of Classification Search
CPC ....... A47C 29/003; E04B 1/3483; E04B 1/54; E04B 1/5818; E04B 2001/5881; E04B 1/5831; E04C 3/00; E04C 3/36; E04C 2003/0465; E04C 2003/0439; F16B 7/0433
USPC .................................. 52/653.2, 79.1, 309.1
See application file for complete search history.

(56) References Cited

U.S. PATENT DOCUMENTS 3,901,612 A * 8/1975 Canin ..................... F16B 7/187
403/189
5,402,608 A * 4/1995 Chu ..................... E04B 1/3483
52/745.2
(Continued)

FOREIGN PATENT DOCUMENTS

JP 06-042061 2/1994
KR 10-0886695 3/2009
(Continued)

*Primary Examiner* — Basil Katcheves
(74) *Attorney, Agent, or Firm* — Weiss & Moy, P.C.; Jeffrey D. Moy

(57) ABSTRACT

The present invention is a technology concerning hexahedron units, and discloses the inventive novel frame structures and frame joint technology for facilitating the assembly of different units. The inventive hexahedron units may be assembled to fit location conditions so as to construct a building regardless of the size and shape of the land, and also disassembled so as to be removed to another place for construction, thus providing high reusability.

15 Claims, 17 Drawing Sheets

(51) Int. Cl.
  *E04B 1/348*  (2006.01)
  *E04C 3/00*  (2006.01)
  *E04C 3/36*  (2006.01)
  E04B 1/58  (2006.01)
  E04C 3/04  (2006.01)
  F16B 7/04  (2006.01)

(56) References Cited

U.S. PATENT DOCUMENTS

| | | | | |
|---|---|---|---|---|
| 5,413,836 A * | 5/1995 | Hsieh | ............ | F16B 37/046 |
| | | | | 428/122 |
| 5,647,181 A * | 7/1997 | Hunts | ............ | A63H 33/10 |
| | | | | 312/111 |
| 6,481,177 B1 * | 11/2002 | Wood | ............ | F16B 7/187 |
| | | | | 403/189 |
| 7,004,667 B2 * | 2/2006 | Ludwig | ............ | E04B 9/14 |
| | | | | 403/187 |
| 8,601,765 B2 * | 12/2013 | Lord | ............ | F16B 5/0088 |
| | | | | 312/111 |
| 2011/0000146 A1 * | 1/2011 | Takeda | ............ | A47C 29/003 |
| | | | | 52/79.1 |

FOREIGN PATENT DOCUMENTS

| | | |
|---|---|---|
| KR | 10-2010-0112058 | 10/2010 |
| KR | 10-2010-0081281 | 2/2012 |
| KR | 10-2012-0023804 | 3/2012 |
| WO | WO2006-092391 | 9/2006 |

\* cited by examiner

HEXAHEDRON UNIT FOR PREFABRICATED BUILDINGS AND METHOD OF ASSEMBLING THE HEXAHEDRON UNITS

RELATED APPLICATIONS

The present utility patent application is related and claims priority from PCT/KR2013/001255, filed Feb. 18, 2013. The present patent application is further related to Korean applications KR 10-2012-0018454, filed Feb. 23, 2012 and KR 10-2012-0023804, filed Mar. 8, 2012.

TECHNICAL FIELD

The present invention relates, in general, to a hexahedron unit for prefabricated buildings and a method of assembling the hexahedron units

BACKGROUND ART

Generally, the fields of building and construction produce ⅓ of the amount of total pollution in Korea, and houses and office buildings constitute 25.7% (in 2000) of national energy consumption. Thus, it is important in terms of the accumulation of resources to reduce building waste with the extension of a building's lifespan through renovation of buildings and to increase the recycling of building-related materials. Now is time for innovations in architectural technology to realize the goal of a 15% reduction in greenhouse gas emissions by 2020, a reduction in the environmental load of buildings via the development of new technologies, and to increase the recycling of resources through the extension and reuse of buildings.

The greatest factor affecting the environment in the field of building and construction may be the disposal of waste. Generally, construction waste is disposed of by landfill or incineration. Waste landfills may possibly lead to the destruction of marine environments including sea areas and coastlines, as well as the ecosystems of the land such as soil, underground water, etc. in mountainous regions. In addition, it is true that a lack of waste disposal plants and limitation of throughput in waste disposal have become a serious social problem, and particularly, illegal dumping of construction waste continues. Further, waste disposal by incineration contributes to global warming by emission of $CO_2$ and additionally negatively affects human health due to the emission of environmental pollutants such as dioxins or the like.

As basic measures to deal with this waste disposal, it is required to prevent waste discharge, and even in this case, restrict, as far as possible, the generation of waste itself. That is, in order to obtain cyclical expansion in the field of construction, there is a rising interest in the reduction, reuse, and recycling (3R) of construction waste.

As part of an effort to deal with these problems, a unit for prefabricated buildings has been developed. Such a unit for prefabricated buildings relates to a technology whereby box-type iron frames are prefabricated in a plant, and they are assembled at sites within a short period in a simplified process.

Korean Patent No. 10-0329714 discloses a box-type unit for prefabricated buildings in which a corner post of a box-type unit for a lower-stair is provided with a screw hole, into which a screw pin is screwed, thereby facilitating the centering, screw-engaging and screw-disengaging of the pin.

Korean Patent No. 10-1020213 discloses a movable prefabricated building and an assembling method thereof, in which cones, frames, outer walls, a ceiling part, and a bottom part are individually fabricated, so that they are assembled in such a manner that the cones and the frames are assembled so as to form a framework, and the bottom part, the ceiling part and the outer walls are sequentially bolted thereto, thereby constructing the interior of the prefabricated building to suit the use of the building.

However, although the conventional techniques relate to prefabrication techniques, units are prefabricated in a plant to suit the predetermined design of the building and then are assembled at sites in such a manner that basic units are only extended so that they are connected together by means of a connection as in a so-called Lego toy, thereby constructing a desired shape of a building. However, such conventional techniques have not achieved commercial success.

Particularly, since the connection (or assembly) between the basic units is not easy, it is difficult to practically apply the conventional techniques to real structures.

DISCLOSURE

Technical Problem

Accordingly, an object of the present invention is to provide a technology in which basic units for prefabricated buildings are easily and rapidly assembled into a desired design of the building. Specifically, the object is to provide a technology to facilitate the assembly of the basic units through a novel structure of a frame of a basic unit and a frame joint for assembling the frames.

Technical Solution

In order to accomplish the above object(s), the present invention provides a hexahedron unit for prefabricated buildings including twelve frames, wherein two frames of adjoining units are fixedly connected by means of a frame joint, wherein the frame joint includes a planar frame joint body, two or more connectors vertically coupled to the frame joint body, and an insertion section connected to an end side of the connector, and wherein the frame includes an elongated bar-type frame body having a hollow rectangular sectional shape with a plurality of internal compartments divided by a plurality of partition walls, and a hollow insertion-space defined in the frame body in a shape corresponding to that of the insertion section of the frame joint body for fitting-engagement with the insertion section.

The frame may further include a longitudinal slot formed at the middle portion of the surface of the frame body, and insertion cutoffs formed on opposite sides of the slot and each having a cut width smaller than that of the slot, wherein the insertion section is fixed to the insertion-space by inserting the insertion section into the slot and then laterally moving the insertion section along the insertion-space provided underneath the insertion cutoffs.

The sectional shape of the insertion section may have any one of "ㄇ", "⊔", a triangle, a rectangle, a pentagon, a hexagon, an octagon, and a partially-modified shape of the former shapes.

The insertion section of the frame joint may be an expandable member whose sectional shape has an open structure so that, upon filling with a filler material, the insertion section expands (gets wider) so as to intensify the fitting-engagement with the insertion-space of the frame.

A filler tube may be further provided so as to store the filler material to be directly injected and expand into the insertion section of the frame joint.

The filler tube may have a sectional shape having an open structure and may be composed of any one of metal, synthetic resin, and rubber.

The filler material may comprise urethane.

The frame may be provided, on respective faces, with two or more insertion-spaces.

The frame joint may be provided with two or more connectors each having the insertion section on the end side thereof.

The connector of the frame joint may be coupled to an end side or a middle portion of the frame joint body.

In another aspect, the present invention provides a method of assembling hexahedron units for prefabricated buildings, each hexahedron unit including twelve frames, wherein the frame includes an elongated bar-type frame body having a hollow rectangular sectional shape with a plurality of internal compartments divided by a plurality of partition walls, and one or more hollow insertion-spaces defined in one face of the frame body for fitting-engagement, wherein a frame joint includes a planar frame joint body, two or more connectors vertically coupled to the frame joint body, and an insertion section connected to an end side of the connector such that the insertion section is inserted and fitted into the insertion-space of the frame, the method including assembling the hexahedron units by inserting and fitting the insertion sections of the frame joint into the respective insertion-spaces of two frames of adjoining hexahedron units, using the frame joint.

The frame may further include a longitudinal slot formed at the middle portion of the surface of the frame body, and insertion cutoffs formed on opposite sides of the slot and each having a cut width smaller than that of the slot, wherein the insertion section is fixed to the insertion-space by inserting the insertion section into the slot and then laterally moving the insertion section along the insertion-space provided underneath the insertion cutoffs.

The sectional shape of the insertion section may have any one of "⊓", "⊔", a triangle, a rectangle, a pentagon, a hexagon, an octagon, and a partially-modified shape of the former shapes.

The insertion section of the frame joint may be an expandable member whose sectional shape has an open structure so that, upon filling with a filler material, the insertion section expands (gets wider) so as to intensify the fitting-engagement with the insertion-space of the frame.

A filler tube may be further provided so as to store the filler material to be directly injected and expand into the insertion section of the frame joint.

The filler tube may have a sectional shape having an open structure and may be composed of any one of metal, synthetic resin, and rubber.

The filler material may comprise urethane.

The frame may be provided, on respective faces, with two or more insertion-spaces.

The frame joint may be provided with two or more connectors each having the insertion section on the end side thereof.

The connector of the frame joint may be coupled to an end side or a middle portion of the frame joint body.

Advantageous Effects

According to the present invention, hexahedron units for prefabricated buildings are easily connected together by means of the frame joint, thereby constructing a desired design of the building. Particularly, the frame joint expands with an expandable filler material, thereby intensifying the fitting-engagement between the hexahedron units. The hexahedron units are easily assembled so as to construct a building regardless of the size and shape of the land, and also are easily disassembled so as to be removed to another place for construction, thus providing high reusability.

DESCRIPTION OF DRAWINGS

FIG. 3b is a cross-sectional view of a frame joint according to an embodiment of the present invention, which is applicable to the frame of FIG. 3a;

FIG. 3d is a cross-sectional view showing a variety of frame joints applicable to the frame of FIG. 3a;

FIG. 4a is a perspective view of a frame according to another embodiment of the present invention, wherein a sectional shape thereof is different from that of the frame of FIG. 2a;

DESCRIPTION OF THE REFERENCE NUMERALS IN THE DRAWINGS

Figure 1A:
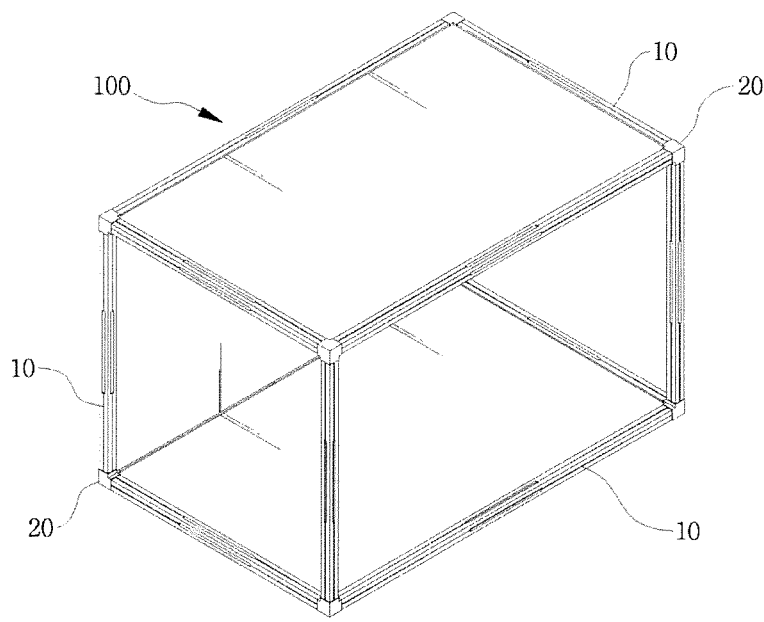
FIG. 1a is a perspective view of a rectangular parallelepiped unit according to an embodiment of the present invention.

| | |
|---|---|
| 10: Frame | 11: Frame body |
| 12: Slot | 13: Insertion cutoff |
| 13: Insertion-space | 15: Partition wall |
| 16: Central space | 20: Corner-finishing material |
| 30: Frame joint | 31: Frame joint body |
| 31a: Connector | 32: Insertion section |
| 33: Expandable tube | 40: Filler material |
| 100: Hexahedron unit | 1000: Building |

MODE FOR INVENTION

The present invention is a technology concerning hexahedron units for prefabricated buildings, and discloses the inventive novel frame structures and frame joint technology for facilitating the assembly of different units. It is noted that the terms "insertion sections" used herein with different reference numerals refer to the same configurations which are inserted into "insertion-spaces" of the frame.

The present invention will now be described with reference to the accompanying drawings.

Figure 1B:
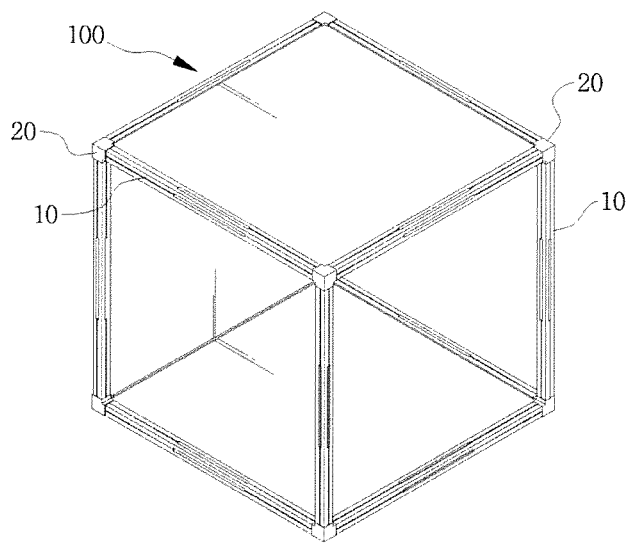
FIG. 1b is a perspective view of a regular hexahedron unit according to an embodiment of the present invention.

FIG. 1a is a perspective view of a rectangular parallelepiped unit 100 according to an embodiment of the present invention, and FIG. 1b is a perspective view of a regular hexahedron unit 100 according to an embodiment of the present invention. The hexahedron unit is a hexahedron body which consists of 12 frames 10 forming 12 sides of the hexahedron body. In the present invention, the hexahedron unit may be, but is not limited to, a regular hexahedron body. This is because, although the regular hexahedron units are easy to be connected together due to their equidistant spacing, if it is required to construct an asymmetrical structure (e.g., vertically long rather than horizontally, wide width rather than height, or the like), a rectangular parallelepiped may be advantageous. A respective corner at which three frames 10 meet is provided with a corner-finishing material 20 in order to connect the three frames 10.

Figure 1C:
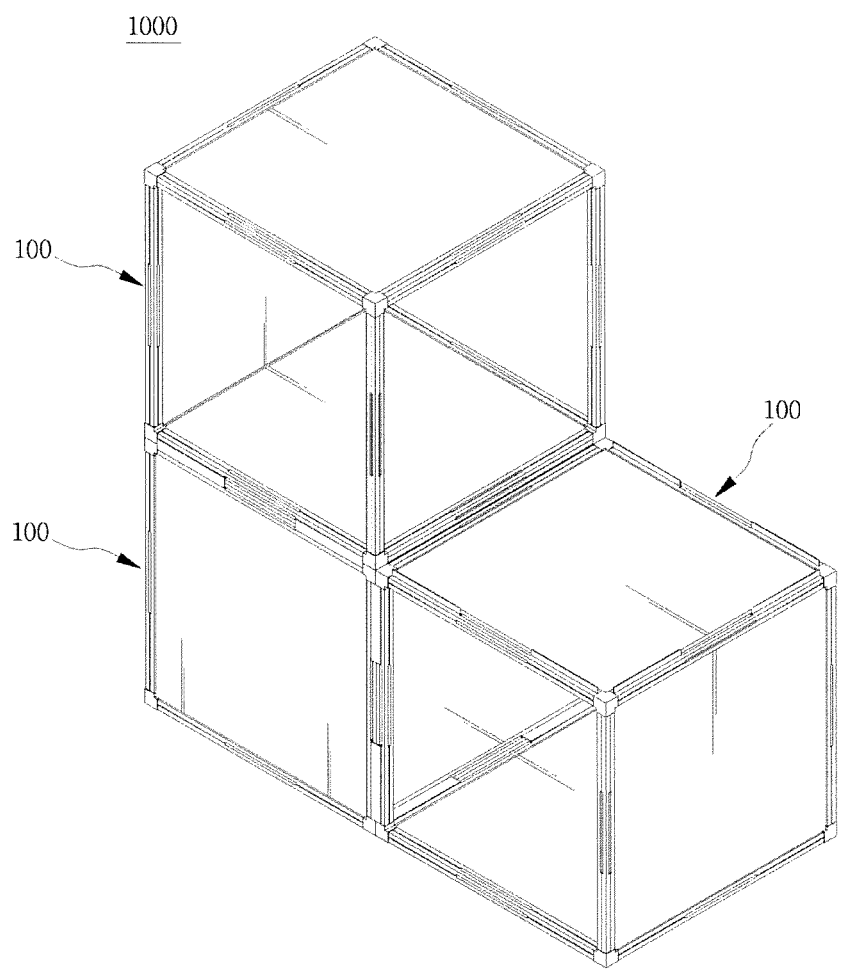
FIG. 1c is a perspective view of the assembly of the hexahedron units, constructing a building.

FIG. 1c is a perspective view of the assembly of the hexahedron units 100, constructing a building 1000. In order to connect different hexahedron units 100, frames 10 of the different hexahedron units 100 must be essentially connected. The present invention provides a technique to connect the frames 10 of the different hexahedron units 100 to be brought into contact (to be assembled), in order to connect the different hexahedron units 100 together.

The connection between the frames 10 will be described with reference to the accompanying drawings. Since the present invention relates to the technique for the connection between frames 10, an external panel and an internal panel on the outside and inside of the hexahedron body formed by the frames 10 will not be illustrated in the drawings, but the frame and the frame joint are mainly illustrated in the drawings. The frames to be brought into contact and connected mean the frames of the different hexahedron units. In the drawings, the frames 10 which come into contact with each other depict that the frame 10 of one hexahedron unit 100 contacts the frame 10 of another hexahedron unit 100. In addition, for convenience of explanation, only one frame 10 among twelve frames constituting the hexahedron body is illustrated, and other frames 10 and internal and external panels and the like are omitted in the drawings.

Figure 1D:
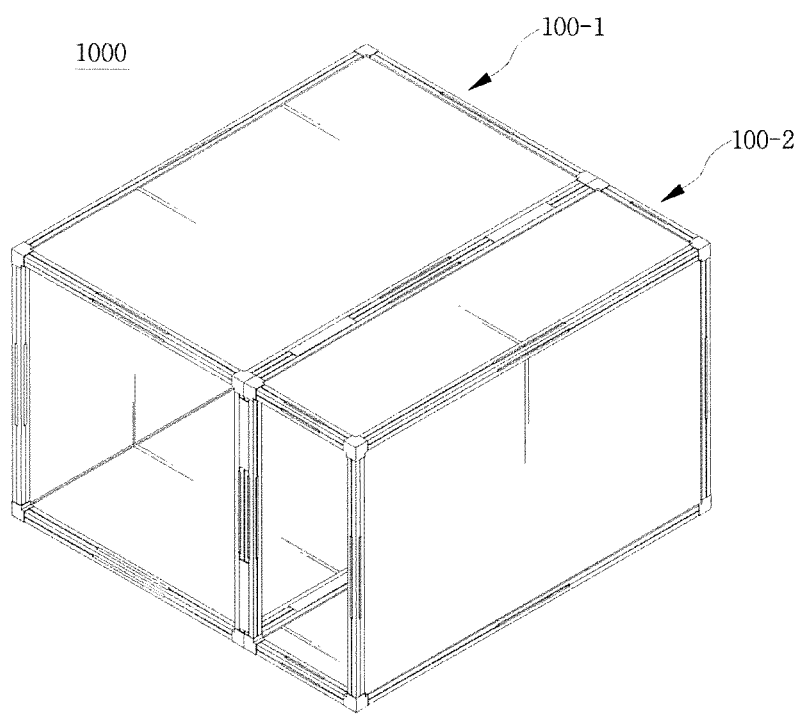
FIG. 1d is a perspective view of the assembly of the hexahedron units having different lengths.

FIG. 1d is a perspective view of the assembly of a relatively-large hexahedron unit 100-1 and a relatively-small hexahedron unit 100-2. As shown in FIG. 1d, with the assembly of the hexahedron units with different sizes, the relatively-small hexahedron unit 100-2 can be used as a narrow-space structure such as a hallway.

Figure 2A:
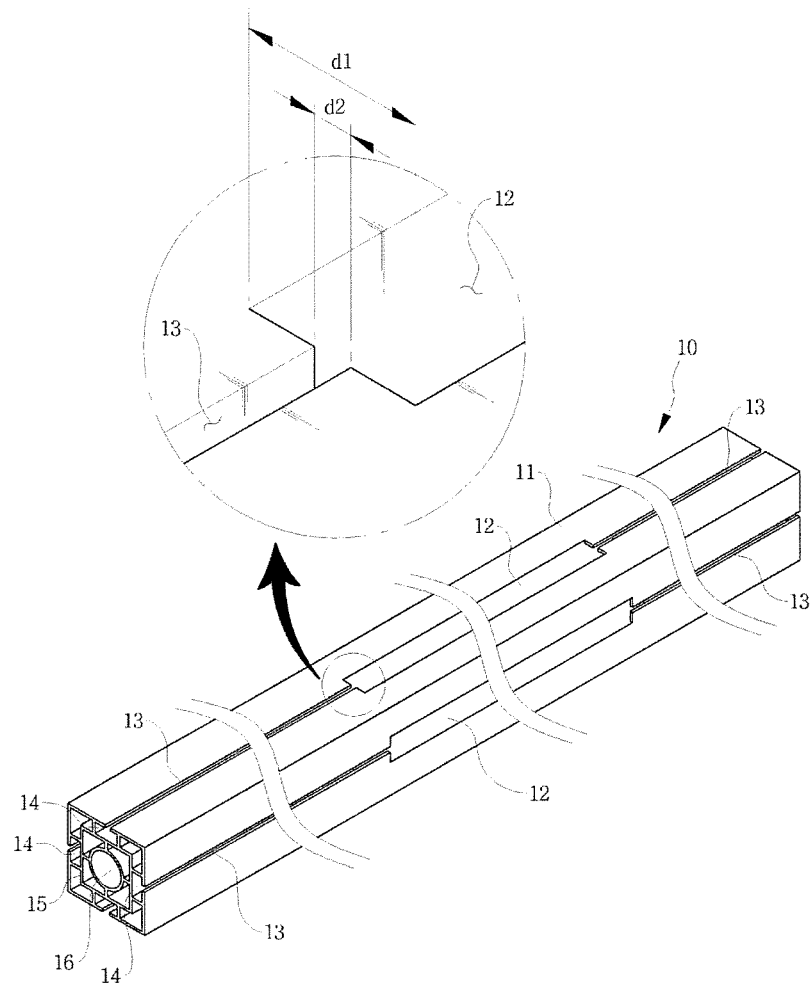
FIG. 2a shows a frame according to an embodiment of the present invention, which is shown in a perspective view with a portion enlarged.

FIG. 2a shows a frame 10 according to an embodiment of the present invention. Twelve frames 10 are mutually vertically connected together so as to form a rectangular parallelepiped or regular hexahedron unit. The frame 10 is an elongated bar-type frame having a rectangular sectional shape, in which a plurality of hollow sections is defined. The sectional shape may preferably be of a square in which four inner and outer faces are the same symmetrical shape. The square-section frame 10 has a symmetrical structure on the inside and outside thereof, so that the connection between the frames is easily performed regardless of the directional arrangement of the frames, thereby providing a good assembly. Hereinafter, the present invention will be described with respect to the square-section frame 10.

The frame 10 of the present invention is preferably provided, on the respective faces, with slot 12 and insertion cutoffs 13 on opposite sides of the slot 12, wherein the slot is a portion that is cut along the longitudinally-central line of the respective face of the frame, and the width of the insertion cutoff is smaller than that of the slot (d1>d2). A frame joint 30 is connected to the frame in such a manner that an insertion section 32 of the frame joint 30 is inserted into the slot 12 and is moved along and fitted with the insertion cutoffs 13 on the opposite sides of the slot (see FIG. 2b).

That is, the slot 12 serves as an inlet into which the frame joint is stably received. Thus, it is reasonable that the width (d1) of the slot 12 be equal to or wider than the width (d2) of the insertion section 32 such that the insertion section 32 of the frame joint 30 can be inserted into the slot.

Further, as described above, the internal space of the frame 10 may preferably be symmetrical in the vertical and lateral directions by means of the partition walls 15, so that empty spaces having a desired shape and size, i.e. hollow insertion-spaces 14, are formed by the partition walls. Although FIG. 2a illustrates that the insertion-space 14 is provided one by one for respective faces, two or more insertion-spaces may also be provided for each face of the frame. This configuration will be described later with reference to FIGS. 3a to 3f.

The insertion-space 14 must have an empty or hollow portion of which shape corresponds to that of the insertion section 32 of the frame joint 30 for mutual fitting-engagement between them. Since the shape of the insertion section 32 can be diversely varied, the shapes of the insertion section 32 and the insertion-space 14 are not limited to a special shape.

The partition walls 15 define the plurality of hollow portions, and among them, a central space 16 is preferably formed at the central portion of the section of the frame. The central space 16 may preferably have a sectional shape like a circle, a hexagon, or a substantially-circular shape, which contributes to the uniform distribution of load applied to the frame 10, thereby preventing centralization of external load to a local portion of the frame 10. An insulating material may fill the hollow portions defined by the partition walls 15 so as to provide an insulating effect. Alternatively, except the insertion-space 14, the inside of the section of the frame 10 may consist of a solid section rather than being defined by the partition walls.

Figure 2B:
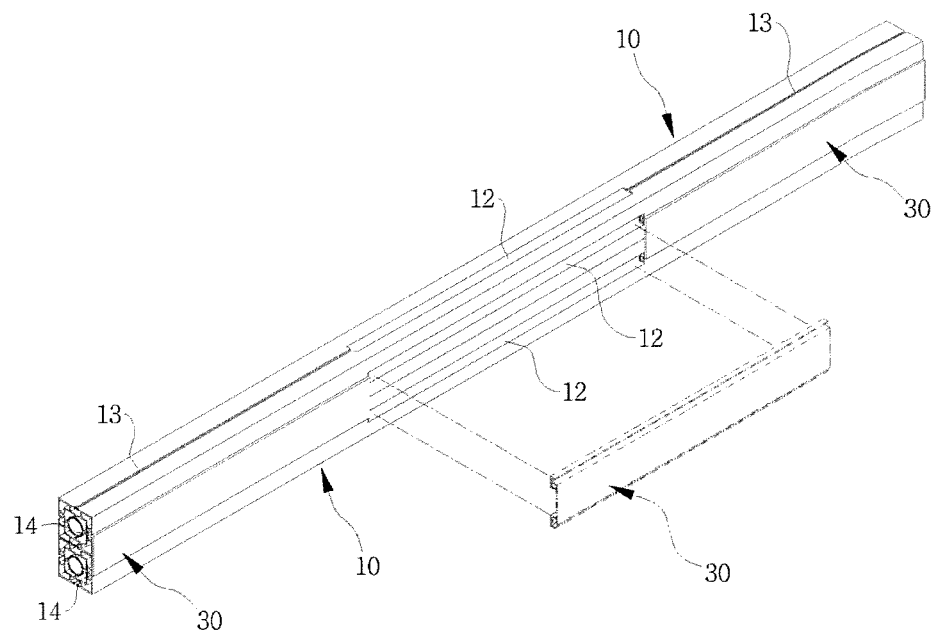
FIG. 2b is a view showing two frames of adjoining hexahedron units being fixedly connected by means of a frame joint.

FIG. 2b is a view showing two frames 10 of adjoining hexahedron units being fixedly connected by means of a frame joint 30. As described above, two insertion sections 32 of the frame joint 30 are inserted one by one into respective slots 12 of different frames 10, and are laterally moved along the insertion cutoffs 13 and are placed in the insertion-spaces 14 formed underneath the insertion cutoffs 13. Alternatively, as shown in FIG. 2b, two adjoining frames 10 are preferably connected together by means of two frame joints 30 being placed at opposite sides of the slots 12, thereby uniformly distributing the connection force in opposite lateral directions.

Hereinafter, the structure of the frame joint 30 will be described in detail with reference to the accompanying drawings.

Figure 2C:
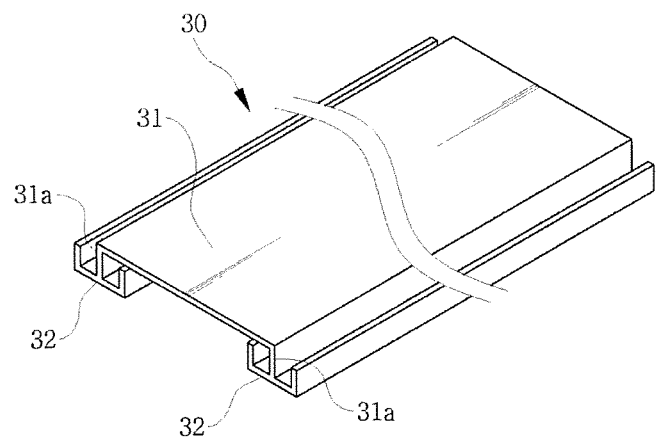
FIG. 2c is a perspective view of a frame joint according to an embodiment of the present invention.
Figure 2D:
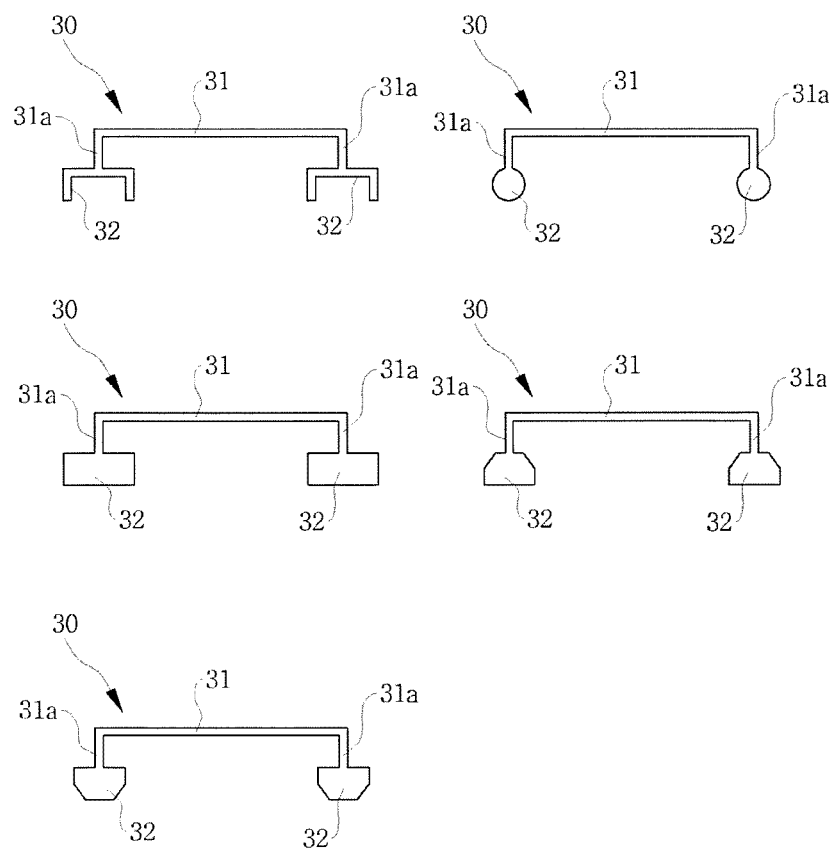
FIG. 2d shows a variety of available frame joints shown in cross-sectional views.

FIG. 2c is a perspective view of a frame joint 30 according to an embodiment of the present invention. The frame joint 30 of FIG. 2c includes an elongated planar frame joint body 31 of which widthwise ends are provided with connectors 31a bent at a right angle. The connectors 31a are respectively provided with an insertion section 32. The width of the connector 31a is equal to or smaller than the insertion cutoffs 13 of the frame 10 so that the connector can be positioned at the insertion-space 14 underneath the insertion cutoffs 13 when the frame joint 30 is inserted into the slot and is moved in a lateral direction. Although the connectors 31a of FIG. 2c are connected to respective widthwise ends of the frame joint body 31, as shown in FIGS. 2f and 2g, the connectors 31a may be connected to the middle portion of the frame joint body 31. In the case where the connectors 31a are positioned at opposite ends of the frame joint body 31 as shown in FIG. 2c, the connectors 31a may be formed by bending the opposite ends of the frame joint body 31, rather than separately bonding the connectors 31a to the frame joint body 31 by means of welding or the like.

In FIG. 2c, the connectors 31a are provided with "⌐"-type insertion sections 32, respectively, which are inserted into slots 12 of different frames 10 and are laterally moved as positioned in the insertion-space 14 formed underneath the insertion cutoff 13. According to the present invention, the shape of the insertion section 32 is not limited to the shape shown in FIG. 2c, but may have a variety of shapes. For example, FIG. 2d shows a variety of sectional shapes of the frame joint 30 including a rectangle, a circle, a pentagon, or the like. That is, the insertion section 32 may have other shapes if the shapes allow the insertion section 32 to be fitted into and engaged with the insertion-space 14 of the frame 10.

Figure 2E:
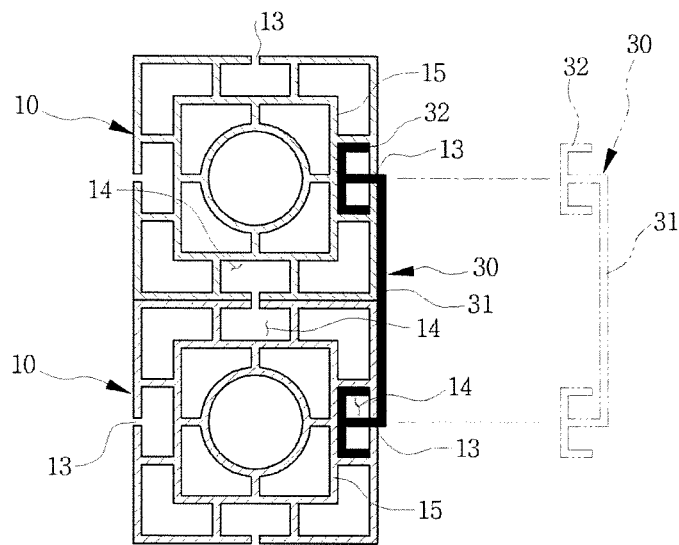
FIG. 2e is a cross-sectional view showing two frames of adjoining hexahedron units being fixedly connected by means of the frame joint of FIG. 2c.
Figure 2F:
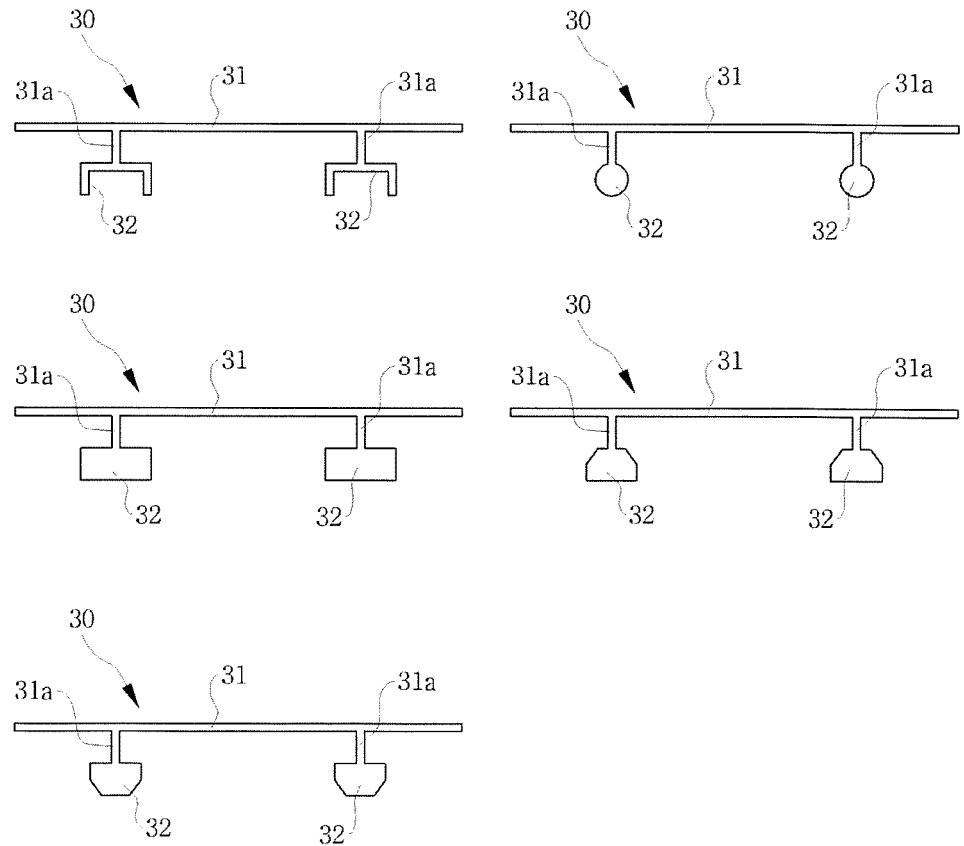
FIG. 2f is a cross-sectional view of a frame joint according to an embodiment of the present invention, wherein an insertion section is fixed to a middle portion rather than an end side of a frame joint body.
Figure 2G:
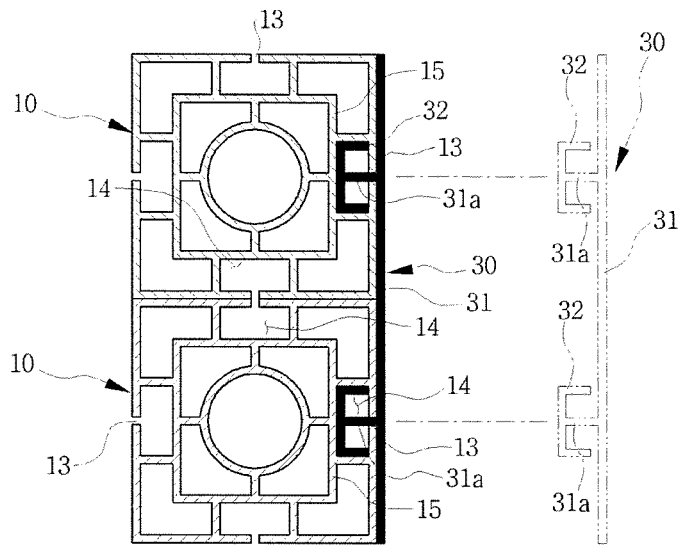
FIG. 2g is a cross-sectional view showing two frames of adjoining hexahedron units being fixedly connected by means of the frame joint of FIG. 2f.

FIG. 2e is a cross-sectional view showing two frames 10 of adjoining hexahedron units 100 being fixedly connected by means of the frame joint 30 of FIG. 2c. Although external and internal panels and other available parts are coupled to the frame 10, for convenience of explanation, they are omitted in the drawings.

In the meantime, as shown in FIG. 2f, two or more connectors 31a which connect the planar frame joint body 31 of the frame joint 30 and the insertion sections 32 can be attached to the middle portion of the frame joint body 31. It is reasonable that the distance between connectors 31a attached to the frame joint body 31 be adjusted depending upon the positions of the insertion-spaces 14 of the adjoining frames 10. When the frames 10 of the adjoining hexahedron units 100 are assembled together by means of the frame joint 30 of FIG. 2f, the assembly has the sectional shape shown in FIG. 2g. In FIG. 2g, the frame joint body 31 covers all of the front sides of the two adjoining frames.

FIGS. 3a to 3f are views showing the frame 10 and the frame joint 30 for assembling the frames 10, wherein the frame is provided, on respective faces, with two insertion-spaces 14, and two slots 12 and two pairs of insertion cutoffs 13 on opposite sides of the two slots, respectively, which are provided correspondingly to the arrangement of the insertion-spaces.

Figure 3A:
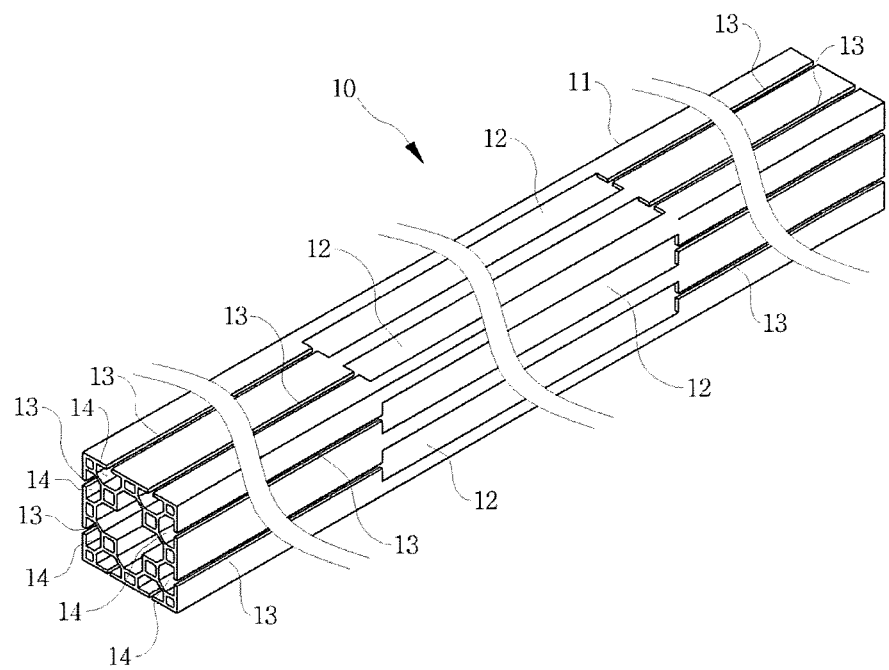
FIG. 3a is a perspective view of a frame according to an embodiment of the present invention, wherein the frame is provided on respective faces thereof with two insertion-spaces.

FIG. 3a is a perspective view of the frame according to an embodiment of the present invention. As shown in FIG. 3a, the frame 10 is provided on respective faces thereof with two insertion-spaces 14. It is reasonable to provide the slots 12 and the insertion cutoffs to suit the number of the insertion-spaces 14. Although FIG. 3a shows an embodiment in which two insertion-spaces 14 are provided, three or more insertion-spaces may be provided.

Figure 3B:
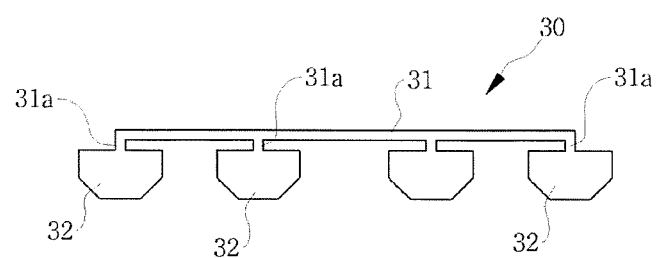

FIG. 3b is a cross-sectional view of a frame joint 30 according to an embodiment of the present invention, which is applicable to the frame of FIG. 3a, wherein a frame joint body 31 of the frame joint is provided with four connectors 31a each having an insertion section 32.

Figure 3C:
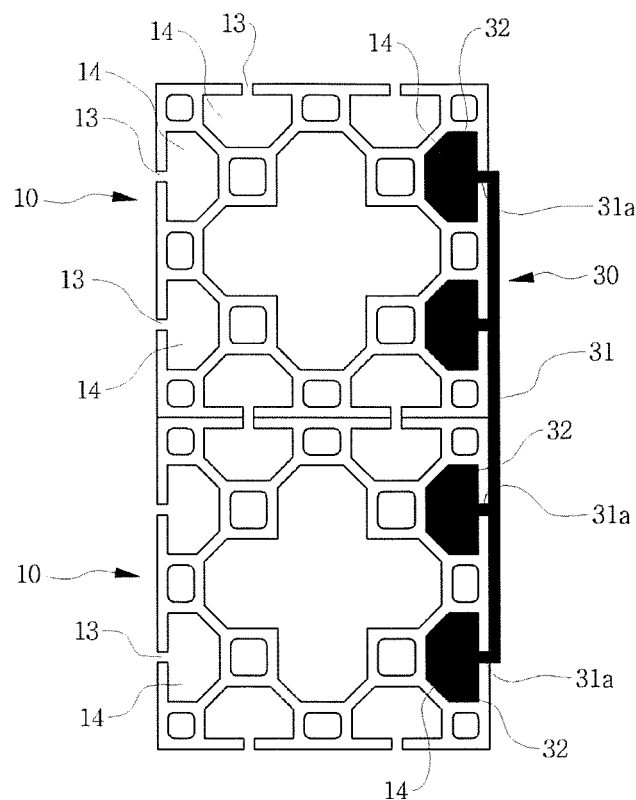
FIG. 3c is a cross-sectional view showing two frames of FIG. 3a being fixedly connected by means of the frame joint of FIG. 3b.

FIG. 3c is a cross-sectional view showing two frames 10 of FIG. 3a being fixedly connected by means of the frame joint 30 of FIG. 3b. As shown in FIG. 3c, two of four insertion M sections 32 on one frame joint are fitted into two insertion-spaces 14 of a frame 10 of one hexahedron unit and the other two insertion sections 32 are fitted into two insertion-spaces of a frame 10 of another hexahedron unit, so that two different frames 10 of two different units 100 can be assembled together.

Figure 3D:
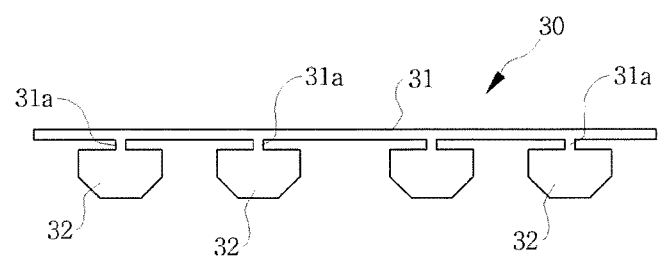
Figure 3E:
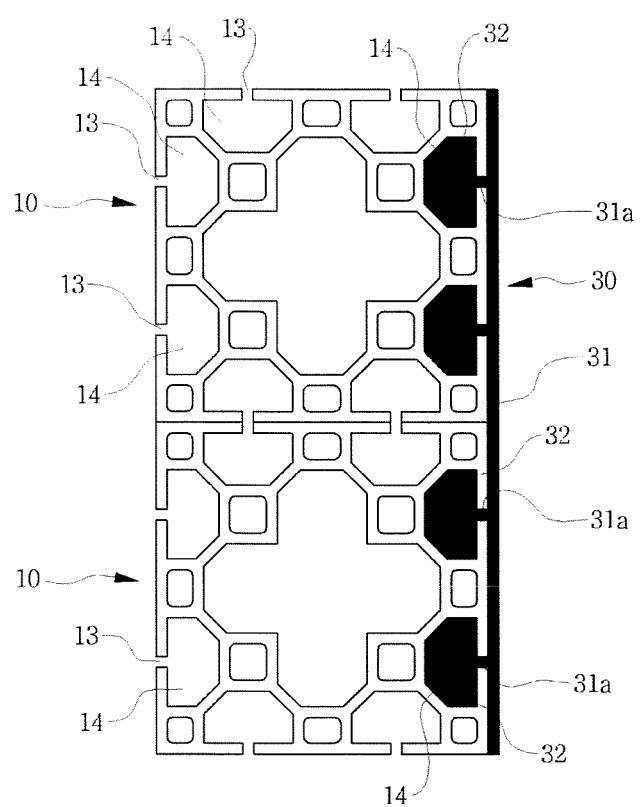
FIG. 3e is a cross-sectional view showing frames of FIG. 3a being fixedly connected by means of the frame joint of FIG. 3d.

FIGS. 3d and 3e show an embodiment in which, unlike the embodiment of FIG. 3b, the insertion sections 32 are positioned at the middle portion of the frame joint body 31 of the frame joint 30. Thus, according to the present invention, the insertion section 32 can be positioned at any position of the frame joint body 31. However, the insertion sections 32 are positioned, taking account of the distance between the insertion-spaces 14.

Figure 3F:
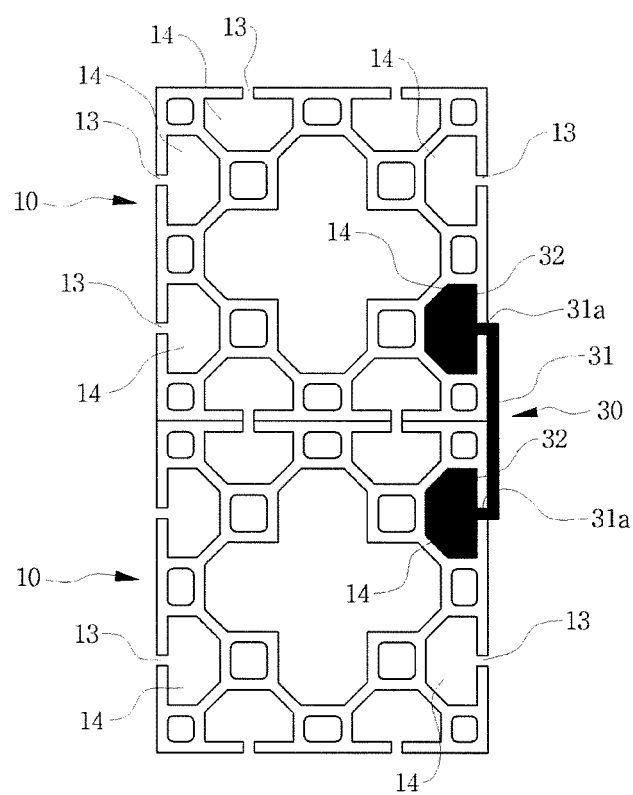
FIG. 3f is a cross-sectional view showing the frame of FIG. 3a being connected by the frame joint, wherein one of the two insertion-spaces of the frame is connected by the frame joint.

Further, as shown in FIG. 3f, even in the case where the frame 10 is provided on respective faces thereof with two (or more) insertion-spaces 14, two adjoining frames can be assembled by using one insertion-space 14 of one frame and another insertion-space 14 of another frame, which are in proximity to an interface between the adjoining frames. In this case, the frame joint 30 has only two insertion sections 32. The remaining insertion-space 14, which is not involved in the assembly, may be used to mount a variety of panels, available parts or the like.

FIGS. 4a to 4e show a frame 10 and a frame joint 30 according to another embodiment, wherein the frame joint 30 is not only fitted into and engaged with the frame, but also, after the fitting engagement, expands so as to intensify the engagement. Specifically, after the fitting engagement, an expandable material such as urethane foam is injected into the insertion section 32 of the frame joint 30, allowing the insertion section to expand and firmly fill the insertion-space 14, thereby intensifying the engagement. Such a frame joint will be referred to hereinafter as an "expandable frame joint". However, the expandable frame joint and normal frame joint are the same basic configuration principle, so they are commonly denoted as the same reference numeral, i.e. 30.

Figure 4A:
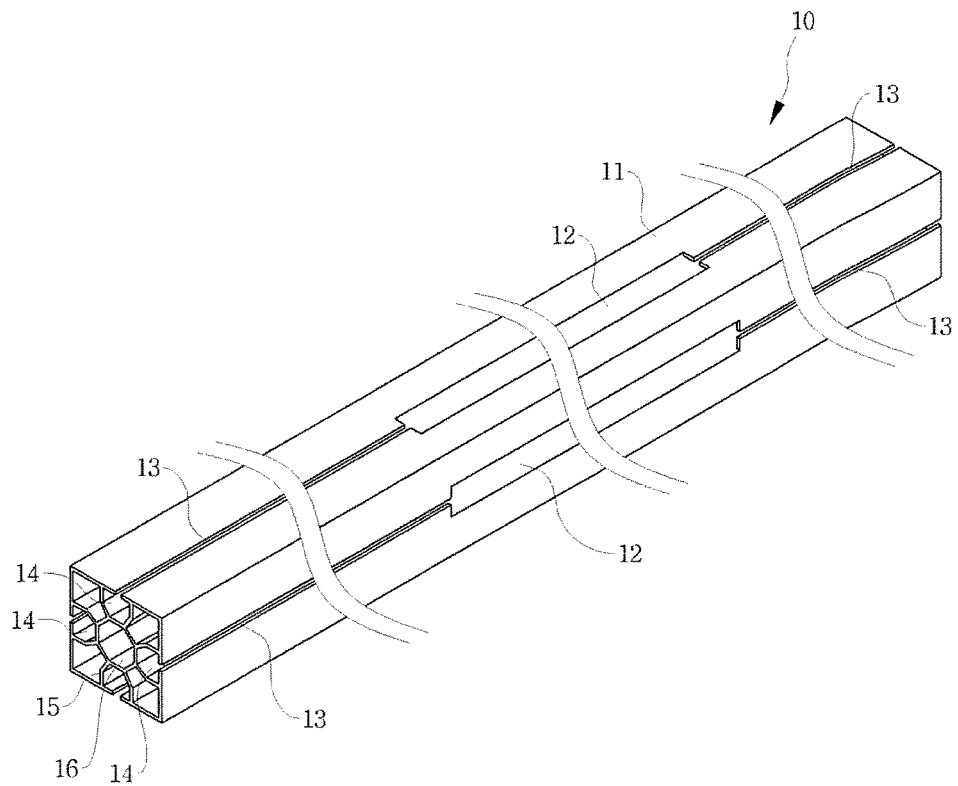
Figure 4B:
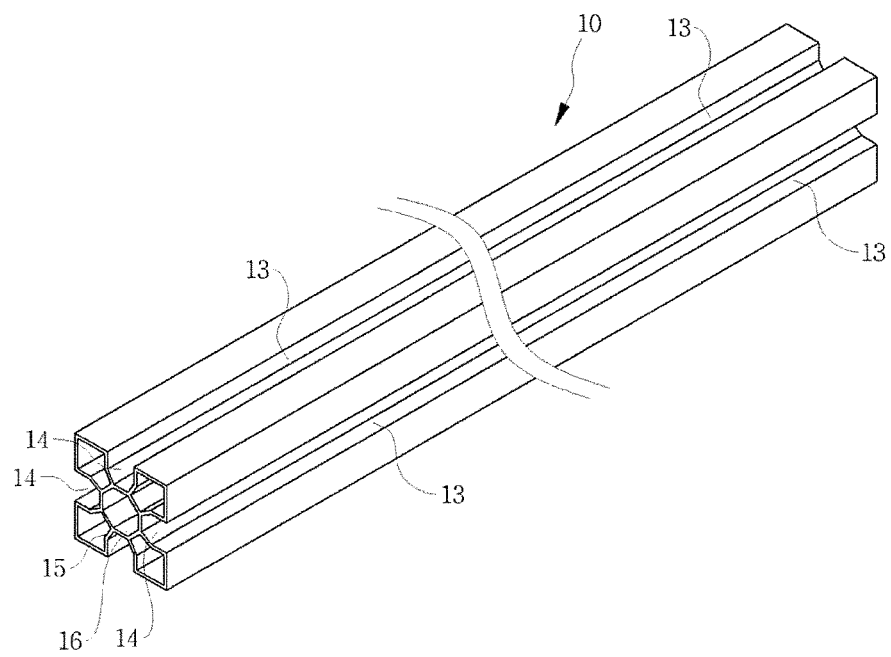
FIG. 4b is a perspective view of a frame according to an embodiment of the present invention, wherein, unlike the configuration of FIG. 3a, a slot is linearly cut on the side of the frame without separate insertion cutoffs.

Although the expandable frame joint can be used with the frames shown in FIGS. 2a to 3f, it has been experimentally found that the expandable frame joint is more applicable to the frames of FIGS. 4a and 4b, of which have a modified pentagon sectional shape rather than a simple rectangle shape. In the meantime, unlike the embodiment of FIG. 4a, FIG. 4b shows the embodiment in which a slot 12 is formed along the whole length of a frame 10 without separate insertion cutoffs 13. In the case of the frame joint 30 of FIGS. 2a to 2e, since it is a simply-insertable type, its engagement force is lower than the expandable frame joint. To compensate for this, the frame is provided with the insertion cutoffs 13 of which width is smaller than that of the insertion section 32 of the frame joint 30, thereby preventing the detachment of the frame joint 30 from the frame. However, in the case of the expandable frame joint, since the expanding force of the expandable frame joint firmly fixes the engagement between frames without the insertion cutoffs 13, the embodiment of FIG. 4b is thereby realized.

Figure 4C:
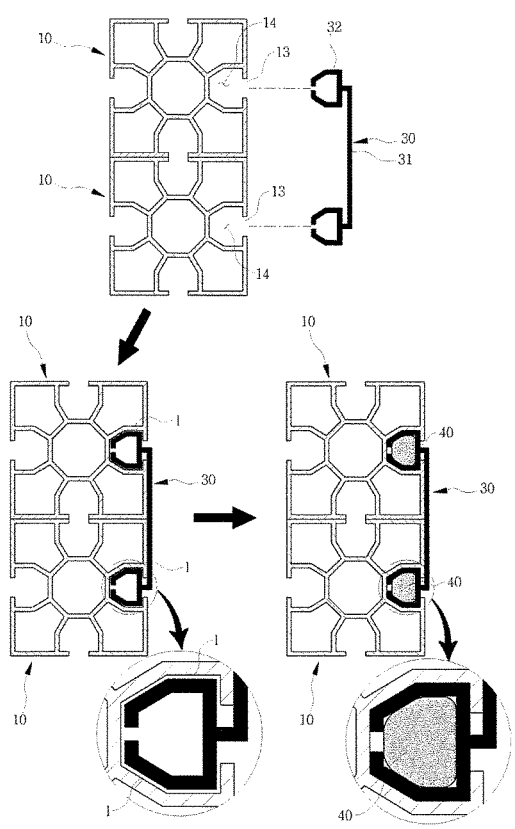
FIG. 4c is a view showing a procedure of connecting two frames by means of an expandable frame joint according to an embodiment of the present invention.

FIG. 4c shows a procedure of connecting two frames by means of an expandable frame joint 30. Similar to the normal frame joint, the expandable frame joint is first inserted into the slot 12 and then is laterally moved along the insertion cutoffs 13 for the engagement therewith (in the case of FIG. 4b, since there is no insertion cutoff, the frame joint can be inserted into an insertion-space at a desired position, and a filler material is injected into the frame joint so that the frame joint can expand). Normally, when the insertion section of the frame joint is inserted into the insertion-space, an empty space, i.e. the tolerance, is generated between the insertion-space 14 and the insertion section 32. This is caused by the fact that such a tolerance occurs therebetween even when they are precisely machined. Thus, for a firmer engagement, the expandable frame joint 30 in which the insertion section can expand and closely contact the insertion-space 14 can be used.

As shown in FIG. 4c, after the expandable frame joint 30 is inserted into the frame 10, the frame joint is filled with a filler material so that the insertion section 32 expands due to the expansion of the filler material, coming into close contact with the insertion-space 14. In the present invention, the filler material may preferably be urethane foam, which is cured after it foams. The filler material may be injected into the insertion section 32 through the slot 12 by means of a syringe or other tools.

Figure 4D:
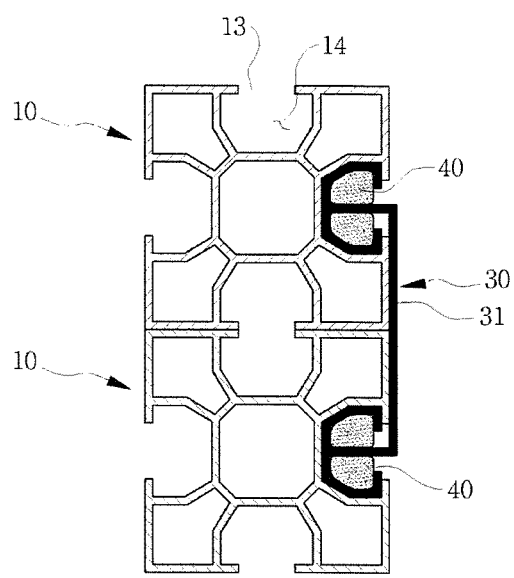
FIG. 4d is a cross-sectional view showing frames being fixedly connected by means of the expandable frame joint.

FIG. 4d shows an expandable frame joint according to another embodiment. The embodiment of FIG. 4d has the same engagement principle as the embodiment of FIG. 4c, except that the shape of the insertion section 32 is different from that of FIG. 4c. In order to maintain the frame joint to be expandable, as shown in FIGS. 4c and 4d, the insertion section must have an open loop-type sectional shape (e.g. "⊓", "⊔" or the like) rather than a closed loop-type shape (e.g. a closed circle "●", a closed rectangle "■" or the like) so that the insertion section 32 can expand owing to the expansion of the filler material. In the claims, such an open loop-type shape is referred to as an "open structure".

Figure 4E:
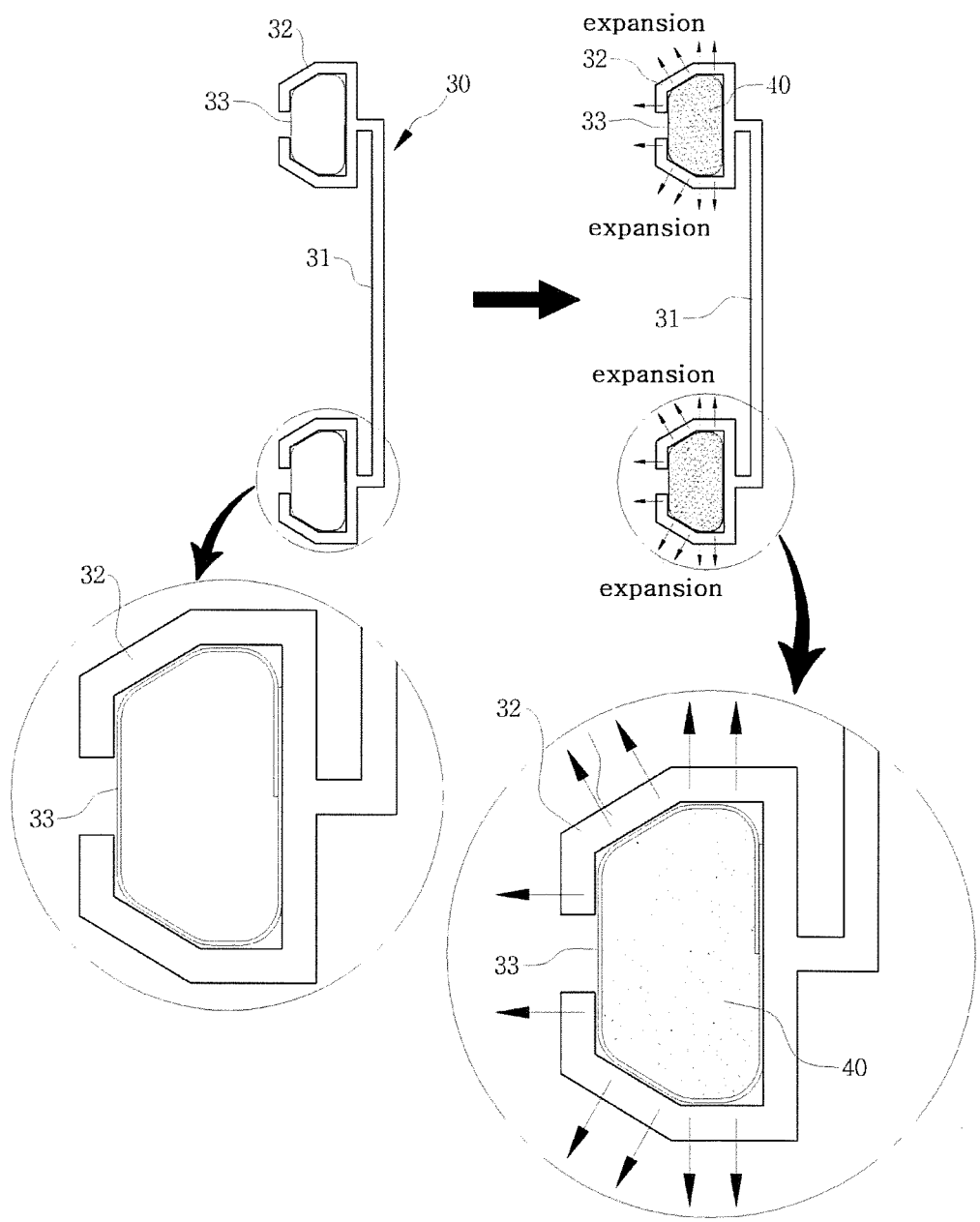
FIG. 4e is a cross-sectional view showing an expandable frame joint, which is further provided with a filler tube in an insertion section, being expanded by the injection of a filler material into the frame joint.

FIG. 4e shows an expandable frame joint which is further provided with a filler tube 33 in an insertion section 32. Although a urethane filler material does not substantially leak out of the insertion section 32 without the filler tube 33, for more secure sealing, the filler tube 33 is preferably provided.

Figure 4F:
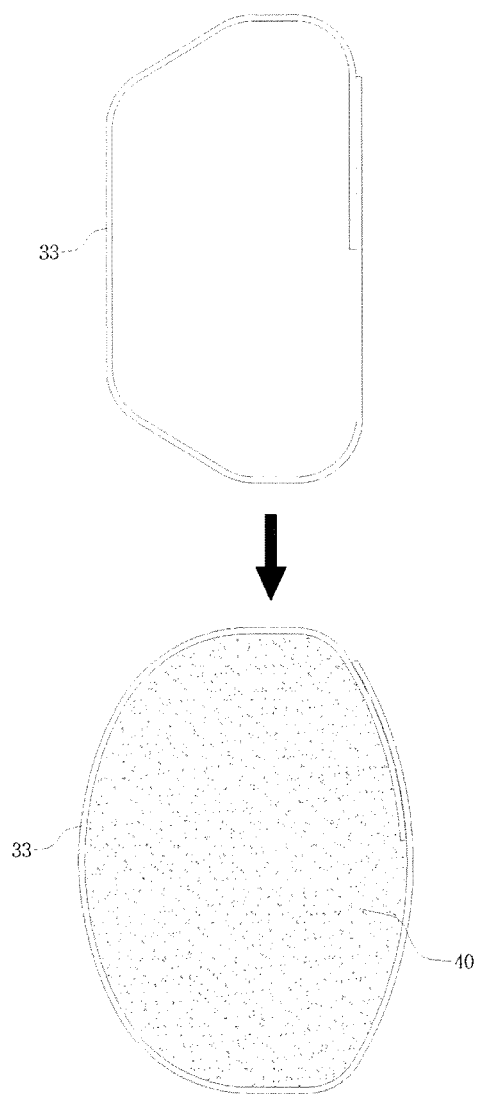
FIG. 4f is a view showing the filler tube being expanded with the injection of the filler material.

When the filler tube 33 is filled with the filler material so that the filler tube 33 expands, the insertion section 32 on the outside of the filler tube 33 also expands. The filler tube 33 may be composed of any of metal, synthetic resin, rubber material, and the like. When the filler tube is composed of non-elastic material, such as metal or synthetic resin, rather than an elastic rubber, as shown in FIG. 4e, the filler tube 33 must have an open-structured sectional shape as shown in FIG. 4f (a partially-cut shape or a shape in which opposite ends overlap each other in a non-fixed state so that, upon injection of the filler material, the filler tube can expand), rather than a close-structured sectional shape (a closed-loop shape like a circle or a rectangle) so that the filler tube can expand when the filler material is injected. The open structure is not limited to the above-mentioned shape, but may have any of other open shapes.

The invention claimed is:

1. A hexahedron unit for prefabricated buildings, comprising twelve frames,
    wherein two frames of adjoining units are fixedly connected by means of a frame joint,
    wherein the frame joint includes a planar frame joint body, two or more connectors vertically coupled to the frame joint body, and an insertion section connected to an end side of the connector,
    wherein the frame includes an elongate bar-type frame body having a hollow rectangular sectional shape with a plurality of internal compartments divided by a plurality of partition walls, and a hollow insertion-space defined in the frame body in a shape corresponding to that of the insertion section of the frame joint body for fitting-engagement with the insertion section,
    wherein the frame further includes a longitudinal slot formed at a middle portion of a surface of the frame body, and insertion cutoffs formed on opposite sides of the slot and each having a cut width smaller than that of the slot,
    wherein the insertion section is fixed to the insertion-space by inserting the insertion section into the slot and then laterally moving the insertion section along the insertion-space provided underneath the insertion cutoffs, and
    wherein the insertion section of the frame joint is an expandable member whose sectional shape has an open structure so that, upon filling with a filler material, the insertion section expands so as to intensify the fitting-engagement with the insertion-space of the frame.

2. The hexahedron unit according to claim 1, wherein the sectional shape of the insertion section has any one of "⊓", "⊔", a triangle, a rectangle, a pentagon, a hexagon, an octagon, a polygon and a circle.

3. The hexahedron unit according to claim 1, wherein a filler tube is further provided so as to store the filler material to be directly injected and expand into the insertion section of the frame joint.

4. The hexahedron unit according to claim 3, wherein the filler tube has a sectional shape having an open structure and is composed of any one of metal, synthetic resin, and rubber.

5. The hexahedron unit according to claim 1, wherein the filler material comprises urethane.

6. The hexahedron unit according to claim 1, wherein the frame is provided, on respective faces, with two or more insertion-spaces.

7. The hexahedron unit according to claim 1, wherein the connector of the frame joint is coupled to a middle portion of the frame joint body.

8. A method of assembling hexahedron units for prefabricated buildings, each hexahedron unit including twelve frames,
  wherein the frame includes an elongated bar-type frame body having a hollow rectangular sectional shape with a plurality of internal compartments divided by a plurality of partition walls, and one or more hollow insertion-spaces defined in one face of the frame body for fitting-engagement,
  wherein a frame joint includes a planar frame joint body, two or more connectors vertically coupled to the frame joint body, and an insertion section connected to an end side of the connector such that the insertion section is inserted and fitted into the insertion-space of the frame, the method comprising:
  assembling the hexahedron units by inserting and fitting the insertion sections of the frame joint into the respective insertion-spaces of two frames of adjoining hexahedron units, using the frame joint,
  wherein the frame further includes a longitudinal slot formed at a middle portion of a surface of the frame body, and insertion cutoffs formed on opposite sides of the slot and each having a cut width smaller than that of the slot,
  wherein the insertion section is fixed to the insertion-space by inserting the insertion section into the slot and then laterally moving the insertion section along the insertion-space provided underneath the insertion cutoffs, and
  wherein the insertion section of the frame joint is an expandable member whose sectional shape has an open structure so that, upon filling with a filler material, the insertion section expands so as to intensify the fitting-engagement with the insertion-space of the frame.

9. The method according to claim 8, wherein the sectional shape of the insertion section has any one of "⊓", "⊔", a triangle, a rectangle, a pentagon, a hexagon, an octagon, a polygon and a circle.

10. The method according to claim 8, wherein a filler tube is further provided so as to store the filler material to be directly injected and expand into the insertion section of the frame joint.

11. The method according to claim 10, wherein the filler tube has a sectional shape having an open structure and is composed of any one of metal, synthetic resin, and rubber.

12. The method according to claim 8, wherein the filler material comprises urethane.

13. The method according to claim 8, wherein the frame is provided, on respective faces, with two or more insertion-spaces.

14. The method according to claim 8, wherein the connector of the frame joint is coupled to a middle portion of the frame joint body.

15. A hexahedron unit for prefabricated buildings, comprising twelve frames,
  wherein two frames of adjoining units are fixedly connected by means of a frame joint,
  wherein the frame joint includes a planar frame joint body, two or more connectors vertically coupled to the frame joint body, and an insertion section connected to an end side of the connector,
  wherein the frame includes an elongate bar-type frame body having a hollow rectangular sectional shape with a plurality of internal compartments divided by a plurality of partition walls, and a hollow insertion-space defined in the frame body in a shape corresponding to that of the insertion section of the frame joint body for fitting-engagement with the insertion section, and
  wherein the insertion section of the frame joint is an expandable member whose sectional shape has an open structure so that, upon filling with a filler material, the insertion section expands so as to intensify the fitting-engagement with the insertion-space of the frame.

* * * * *